United States Patent
Green et al.

(10) Patent No.: US 7,568,023 B2
(45) Date of Patent: Jul. 28, 2009

(54) METHOD, SYSTEM, AND DATA STRUCTURE FOR MONITORING TRANSACTION PERFORMANCE IN A MANAGED COMPUTER NETWORK ENVIRONMENT

(75) Inventors: John Green, Rocklin, CA (US); Steven Smead, Lincoln, CA (US); Brent Enck, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 10/327,035

(22) Filed: Dec. 24, 2002

(65) Prior Publication Data
US 2004/0122942 A1 Jun. 24, 2004

(51) Int. Cl.
*G06F 15/173* (2006.01)
(52) U.S. Cl. ..................... 709/224; 709/223
(58) Field of Classification Search .......... 709/224, 709/223
See application file for complete search history.

(56) References Cited

U.S. PATENT DOCUMENTS

| | | | |
|---|---|---|---|
| 6,308,211 B1 * | 10/2001 | Rosborough et al. | 709/224 |
| 6,587,878 B1 * | 7/2003 | Merriam | 709/224 |
| 6,625,602 B1 * | 9/2003 | Meredith et al. | 707/8 |
| 6,643,613 B2 * | 11/2003 | McGee et al. | 702/186 |
| 6,701,363 B1 * | 3/2004 | Chiu et al. | 709/224 |
| 6,721,765 B2 * | 4/2004 | Ghosh et al. | 707/202 |
| 6,816,898 B1 * | 11/2004 | Scarpelli et al. | 709/224 |
| 7,051,339 B2 * | 5/2006 | Deverill et al. | 719/328 |
| 2002/0129137 A1 * | 9/2002 | Mills et al. | 709/224 |

OTHER PUBLICATIONS

"Application Response Measurement, Issue 3.0—Java Binding", published in the U.K. by The Open Group, Oct. 2001, (US ISBN: 1931624 04 6).

* cited by examiner

*Primary Examiner*—Tonia L Dollinger
*Assistant Examiner*—Kyung H Shin

(57) ABSTRACT

A method, system, and data structure are disclosed for monitoring transaction performance in a managed computer network environment having a requesting component configured to request a transaction of a servicing component. In accordance with exemplary embodiments the transaction is classified into a transaction type. A correlator is generated for the transaction including information identifying a parent transaction type and a root transaction type of the transaction. An events associated with a completion of the transaction is recorded. Performance statistics are aggregated on the transaction completion event in the context of the information included in the correlator.

31 Claims, 3 Drawing Sheets

| | | |
|---|---|---|
| LENGTH OF CORRELATOR | 16-BIT UNSIGNED INTEGER | ARM CONGRUENCE |
| CORRELATOR FORMAT | 8-BIT UNSIGNED CHARACTER | ARM CONGRUENCE BUT WITH CUSTOM FORMAT |
| FLAGS | 8-BIT UNSIGNED CHARACTER | ARM CONGRUENCE |
| PARENT_INSTANCE_ID | GUID | PARENT TRANSACTION IDENTIFIER |
| ROOT_INSTANCE_ID | GUID | ROOT TRANSACTION IDENTIFIER |
| PARENT_TYPE_ID | GUID | PARENT TRANSACTION TYPE IDENTIFIER |
| ROOT_TYPE_ID | GUID | ROOT TRANSACTION TYPE IDENTIFIER |
| CONSUMER_ID | GUID | USER OR USER GROUP IDENTIFIER |
| REQUESTING_COMPONENT_ID | GUID | IDENTIFIER OF COMPONENT REQUESTING TRANSACTION |

FIG. 3

METHOD, SYSTEM, AND DATA STRUCTURE FOR MONITORING TRANSACTION PERFORMANCE IN A MANAGED COMPUTER NETWORK ENVIRONMENT

BACKGROUND

1. Field

The present invention relates to network management. More particularly, the present invention relates to a method, system, and data structure for monitoring transaction performance in a managed computer network environment.

2. Background Information

Information technology (IT) network management operators face technical challenges to identify the cause of a network event that can impact the quality of service available to users (or clients) in a managed computer network. To identify the cause of a network event, or perhaps to take steps to prevent an event from occurring, operators monitor certain performance parameters of the network. Performance parameter measurements used by operators include the availability, the response-time, and the volume (e.g., throughput) of the services provided in the network.

One challenge in measuring and monitoring network performance can be gathering enough data to be able to diagnose the cause of a network event, while not gathering so much data that the measurement system itself impacts the network performance, or that operators cannot efficiently identify network failures in a timely manner.

Network performance monitoring systems fall into two broad categories—those that are intended for use by software developers in a laboratory (or testing) environment and those intended for use by IT operators in a production network environment. The systems used by software developers trace process (or transaction) execution flows through a network while a test is being performed. Once the test completes, analytical tools use the trace data to produce information for optimizing the network performance. These tools can measure and produce significant amounts of data, since a high degree of measurement overhead can be tolerated in the non-production test environment.

High degrees of measurement overhead may not be acceptable in a production network environment. Consequently, production environment measurement systems tend to limit the number of network parameters measured to two or three parameters, such as the number of transactions that occur over a given period of time and the total time those transactions require to execute. Production environment monitoring tools then sample the measured data to produce statistical averages. Diagnosing the cause of network event using these statistical averages can be challenging, as the statistics do not provide detailed information on the transaction execution flows themselves. Moreover, the diagnosis often takes place "off-line" using post-processing analytical tools, which can add to the time required to determine the cause of a network event.

Production environment measurement systems measure response time from an end-to-end perspective, but the decomposition of the measured response time can be limited to observable events that occur at the client site, such as a connection setup time or a document load time. The ability to further decompose end-to-end response-time by observing and correlating related network events on back-end systems, such as web-servers, application-servers, and database-servers, can aid operators in identifying and correcting network failures.

SUMMARY

Accordingly, a method and system are disclosed for monitoring transaction performance in a managed computer network environment having a requesting component configured to request a transaction of a servicing component. In accordance with exemplary embodiments the transaction is classified into a transaction type. A correlator is generated for the transaction including information identifying a parent transaction type and a root transaction type of the transaction. An event associated with a completion of the transaction is recorded. Performance statistics arc aggregated on the transaction completion event in a context of the information included in the correlator.

In accordance with another exemplary embodiment, a data structure stored on computer-readable medium is described for correlating performance statistics on a transaction between a requesting component and a servicing component in a managed computer network environment. A first field stores data identifying a parent transaction of the transaction. A second field stores data identifying a root transaction of the transaction. A third field stores data identifying a parent transaction type of the transaction. A fourth field stores data identifying a root transaction type of the transaction. A fifth field stores data identifying a consumer of the transaction. A sixth field stores data identifying the requesting component.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 3 illustrates a data structure for correlating performance statistics on a transaction in a managed computer network environment according to an exemplary embodiment.

DETAILED DESCRIPTION OF THE PREFERRED EMBODIMENTS

Figure 1:
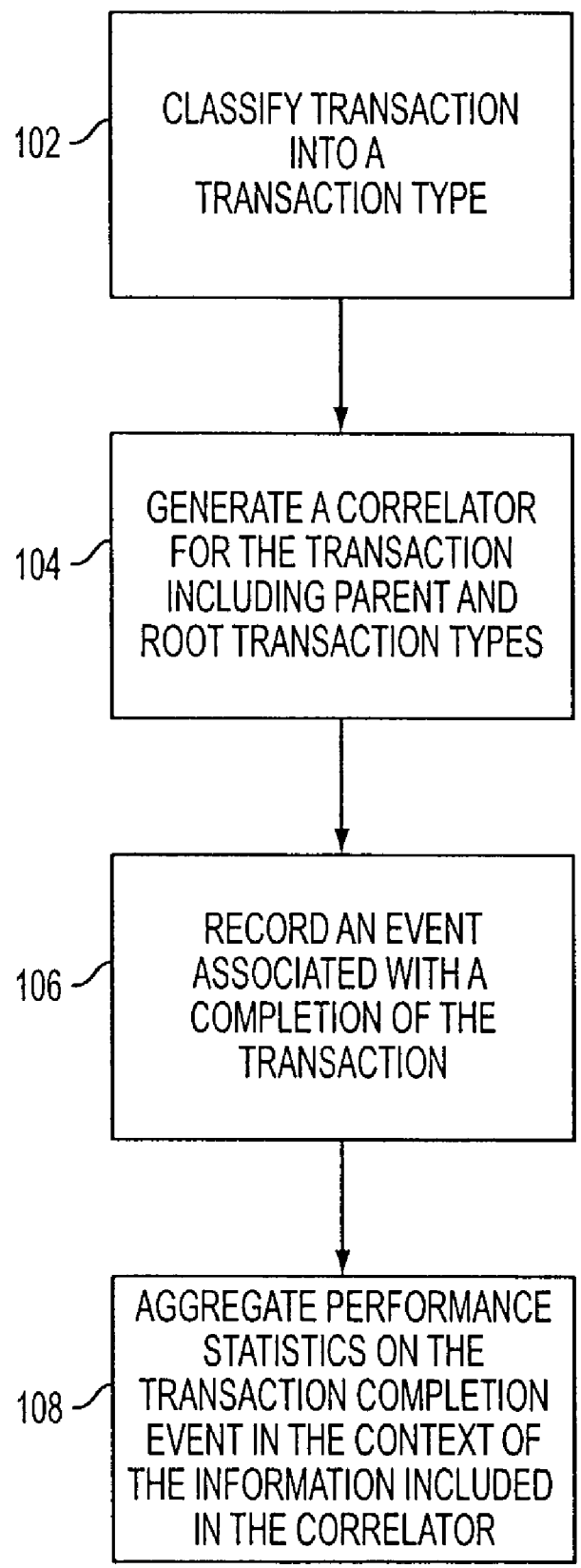
FIG. 1 is a flowchart illustrating steps for monitoring transaction performance in a managed computer network environment according to an exemplary embodiment.

FIG. 1 is a flowchart illustrating the steps for monitoring transaction performance in a managed computer network environment having a requesting component configured to request a transaction of a servicing component. As used herein, a "transaction" can include any delimited segment of processing that occurs in the computer network. To illustrate the concept of a transaction, consider an arrangement, in a managed computer network environment, in which a user is browsing a web site using a web-browser. When the user navigates to a new web page, a first transaction can be defined as starting when the user initiates the navigation (e.g., by clicking on a hypertext link using a mouse), and as ending when the new web page is displayed on the browser. A second transaction can be defined as starting when a web-server requests information needed to render the new web page on the browser, and as ending when the information has been sent to the browser.

As illustrated by the example, transactions can be nested, such that a transaction can invoke zero or more other related transactions, to provide a user with a service or to accomplish a particular task (e.g., display a new web page). This nesting of related transactions can be hierarchical in the sense that there is a first transaction, as well as perhaps a last transaction and several transactions there between, that must be completed to provide the service or accomplish the task. The transactions need not be performed in any particular order, although certain transactions can require an order of transaction completion (e.g., the information needed to render the new web page must be retrieved by the web-server before being displayed on the browser).

Nevertheless, transactions in the hierarchy can invoke (or call) other related transactions in the hierarchy, establishing a parent-child relationship between the calling and called transactions. A transaction that directly calls another transaction in the hierarchy is referred to herein as the "parent" transaction of the called transaction. The first transaction to enter the managed network environment from the transaction hierarchy that provides the service or accomplishes the task is referred to herein as the "root" transaction. The root transaction either directly or indirectly calls all other transactions in the hierarchy. Information regarding the root transaction can provide context as to the type of service being provided or the type of task being accomplished.

Of course, a given service or task can require only a single transaction to complete, in which case the transaction hierarchy collapses to a single level. Under these circumstances, the single transaction can also be considered as the root transaction and the parent (or calling) transaction in the single-level transaction hierarchy.

The example further illustrates that a corresponding hierarchical arrangement of processing components can be used to complete the various transactions required to provide the service or accomplish the task. A processing component that requests a particular transaction to be performed is referred to herein as a "requesting" component (e.g., the web-browser in the example above), while a processing component that completes the requested transaction is referred to as a "servicing" component (e.g., the web-server).

Those skilled in the art will appreciate that there need not be a one-to-one correspondence between the transactions of a transaction hierarchy for a given service or task, and the hierarchical arrangement of processing components employed to perform those transactions. That is, a particular processing component can be capable of completing more than one transaction in the transaction hierarchy. Moreover, each of the processing components in the hierarchical arrangement need not be associated with a single infrastructure (i.e., hardware) component in the computer network. In the example above, the web-server can be configured to include the web-browser processing component, and thus be capable of completing both the first and second transactions in the exemplary two-level transaction hierarchy.

In step 102 of the exemplary method depicted in FIG. 1, the transaction requested of the servicing component is classified into a transaction type. The transaction type defines a logical grouping of related transactions. Performance statistics can be gathered on the classified transaction type, allowing the number of individual transactions for which performance statistics are gathered to be reduced. This, in turn, reduces the measurement overhead, while still yielding useful transaction performance data.

For example, an object can include several processing segments, each of which can be considered to be a separate transaction. All of the processing segments (or transactions) can be classified into a single transaction type based on the object type. Gathering performance statistics based on the classified type, rather than on the individual transactions themselves, can significantly reduce measurement overhead while still yielding useful information on the individual transactions (e.g., their shared relationship with the object).

The classification of transactions into transaction types can be dynamic, changing from more coarsely defined logical groupings of transactions to finely classified or even individually classified transaction types, and vice versa. For example, when an interest arises in the performance statistics of the object type described above, the classification process can be changed to allow individual performance statistics to be gathered on the several processing segments (or transactions) making up that object type. This can enable an operator to determine which of the individual transactions can be most affecting the overall performance of the object. The dynamic classification of transactions allows operators to balance the amount of measurement overhead in the managed network against the need for greater diagnostic capability.

Because related transactions can be arranged hierarchically (or nested) to provide a user with a service or to accomplish a particular task, the transaction types corresponding to those transactions can be thought to be arranged in a hierarchy as well. In this sense, related transaction types can be further classified into a transaction group that provides the service or accomplishes the task. The root transaction type in a transaction group hierarchy, i.e., the classified type of the root transaction in the corresponding transaction hierarchy, can provide context as to the service being provided or the task being accomplished.

In step 104, a correlator is generated for the transaction including information identifying a parent transaction type and a root transaction type of the transaction. A correlator provides context to the performance statistics gathered for a particular transaction by identifying related transactional information that can be used when aggregating and analyzing the statistics. For example, in a transaction hierarchy, often only one transaction (e.g., the root transaction) can be visible to the user, yet any number of nested component transactions can be invoked by the one visible transaction. These component transactions are the children of a parent transaction (perhaps the root transaction), or the child of another child component transaction in the hierarchy (e.g., in a tree-like hierarchical structure). It can be useful to know how much each component transaction in the hierarchy contributes to the total response time of the visible transaction. Similarly, a failure in one of the component transactions can often lead to a failure in the visible transaction, and this information can also be useful.

The related transactional information (or keys) included in a correlator can include identifiers for a root and parent transaction of the transaction, a root and parent transaction type of the transaction, infrastructure components used to process the transaction, including the requesting component, and the consumer of the transaction. An exemplary correlator arrangement is discussed in detail below in conjunction with the data structure illustrated in FIG. 3.

In step 106, an event associated with a completion of the transaction is recorded. Transaction completion events can be recorded by the processing segment forming the transaction itself, or by a separate measurement application (or agent) tasked with monitoring transactions in the managed network. A standardized application program interface (API), or any customized program either included in or separate from an application program interface, can be used to exchange transaction completion information between the processing segment and the measurement agent. For example, with the Application Response Measurement (ARM) API, developed by the ARM Working Group of the Computer Measurement Group (CMG), application developers can invoke ARM API function calls at the beginning and end of each transaction to exchange completion information with any measurement agent capable of using data generated by the ARM API. The ARM API is described in "Application Response Measurement, Issue 3.0—Java Binding", published in the U.K. by The Open Group, October, 2001, (US ISBN: 1931624 04 6), and herein incorporated by reference in its entirety.

The measurement agent used to record the transaction completion events can reside on the same node in the network that includes the servicing component used to service the transaction, or on a separate node in the network. Nodes that include measurement agents are managed nodes, while those that do not are considered unmanaged nodes. Managed nodes have the capability of generating transaction performance statistics that enable the operation of the computer network to be monitored and managed. Processing segments capable of interfacing with the measurement agent are said to be instrumented segments or transactions. Instrumented transactions are capable of interfacing with any of the measurement agents operating in the managed network through an API, such as ARM.

Measurement agents can record several parameters (or events) that can be used to evaluate the performance of a transaction after it completes. Table 1 provides an exemplary listing of transaction completion events that can be recorded for transactions being serviced on a managed node, but it will be appreciated that the list is not exhaustive.

TABLE 1

Transaction Completion Events on a Managed Node

| Completion Event | Description |
| --- | --- |
| timestamp_utc | UTC for transaction completion time |
| TimeZoneBias | Time zone bias (in minutes) of system which recorded the completion event time |
| Instance_Id | Unique instance identifier for this transaction |
| Parent_Instance_Id | Instance identifier for immediate parent-level transaction scope (nesting) |
| Top_Instance_Id | Instance identifier for root transaction scope (nesting). |
| Transaction_Defn_Id | Transaction type identifier. |
| Parent_Defn_Id | Transaction type identifier for parent transaction that is requesting this transaction (only applicable to nested transactions) |
| Top_Defn_Id | Transaction type identifier for top level transaction. |
| Consumer_Id | Identifier for user requesting the service (typically only observable with root transactions). |
| Requesting_Component_Id | Identifier for InfrastructureComponent requesting the service which the Transaction type is part of. (i.e., the computer system requesting this transaction). |
| Servicing_Component_Id | Identifier for InfrastructureComponent providing (i.e., hosting) the service to which the Transaction type is part of. (i.e., the computer system executing this transaction). |
| Completion_Status | Success, Aborted, Failed, Undetermined |
| ElapsedTime | Time to complete (?milliseconds?). |
| ElapsedTime_Threshold | Threshold used to determine if an Elapsed time violation occurred. |
| Tran_Size | An transaction-specific measurement to help calibrate the size of the transaction. For example, bytes-transferred, rows-fetched, etc. |
| ThroughPut_Threshold | Threshold for (Tran_Size/ElapsedTime) |
| Availability_State | Percent of time available for the availability interval (range 0.0-100.0). |
| Avail_Interval_Secs | Number of seconds to be attributed to availability state (i.e., probe interval). |
| URL | |
| Net_Connection_Type | (LAN\|MODEM\|PAD\|X25\| . . . ) |
| Line_Speed | Negotiated line-speed when Net_Connection_Type = "MODEM" |
| Os_Name | Name of operating system |
| Os_Version | Operating system version number |
| Meas_Name | Name of instrumentation agent that measured this transaction |
| Meas_Version | Version of instrumentation that measured this transaction. |

The number of completion events that can be recorded for transactions associated with unmanaged nodes (e.g., the web-browser discussed earlier) can be more limited than the number available on managed nodes (e.g., the web-sever). The limited availability of recordable transaction events can arise because of security concerns that exist at the unmanaged node. Consequently, the completion events recorded for transactions associated with unmanaged nodes tend to include more generalized information such as a connection type and a modem speed (if the network connection type is a modem) of the unmanaged node. This information can be recorded by the transaction itself, and can then be sent to the measurement agent of a managed node in the network for further recordation and aggregation.

In step 108, the recorded transaction completion event is aggregated into performance statistics in a context of the information included in the correlator. Recall that the correlator can include related transactional information (or keys), including the root and parent transaction type of the completed transaction, the infrastructure components used to process the transaction, including the requesting component, and the consumer of the transaction. This information can be passed to the measurement agent (e.g., in the correlator itself), which can then aggregate the transaction completion events into statistics across various combinations of these transactional keys.

Performance statistics can be aggregated across additional transaction keys, including the transaction type of the completed transaction and, when the measurement agent is included on the same node in the network that serviced the transaction, an identification of the servicing component. For example, the ARM 3.0 API can be modified to include a step to pass a correlator having a data structure as illustrated in FIG. 3 to aggregate transaction statistics across the various combinations of available transaction keys. Table 2 provides an exemplary listing of the transaction statistics that can be aggregated using ARM 3.0. Those skilled in the art will appreciate that the list is not exhaustive, and that use of a modified ARM 3.0 API is by way of example only, as any suitable program can be used to aggregate performance statistics in accordance with exemplary embodiments of the present invention.

TABLE 2

Aggregated Performance Statistics

| Aggregated Statistic | Description |
| --- | --- |
| TimeStamp_utc | UTC for summary interval (start of interval time) |
| TimeZoneBias | TimeZoneBias (minutes) of system which recorded this interval |
| Interval_Secs | Number of seconds in collection interval |
| Tran_Defn_Id | Transaction type identifier. |
| Parent_Defn_Id | Callers Transaction type identifier. |
| Top_Defn_Id | Transaction type identifier of top-level transaction |
| Consumer_Id | Identifier for user requesting the service (typically only observable with top-level transactions). |
| Requesting_Component_Id | Identifier for InfrastructureComponent requesting the service which the Transaction type is part of. |
| Servicing_Component_Id | Identifier for InfrastructureComponent providing (i.e., hosting) the service to which the Transaction type is part of. |
| Completion_Count | Number of successfully completed transactions |
| Abort_Count | Number of transactions abort (i.e., cancelled) by users |
| Fail_Count | Number of transactions that failed |
| UndeterminedStatus_Count | Number of transactions that finished but the instrumentation was not able to determine the status. |
| ElapsedTime_Violation_Count | Number of transactions that completed (or had undetermined status) but exceeded the time Threshold (either absolute ElapsedTime Threshold or "normalized" Throughput Threshold). |
| Avg_Comp_ElapsedTime | Average ElapsedTime (milliseconds) of completed transactions |
| Avg_Abort_ElapsedTime | Average ElapsedTime (milliseconds) of completed transactions |
| Avg_NoStatus_ElapsedTime | Average ElapsedTime (milliseconds) of transactions with undetermined status |
| Avg_Tran_Size | Average Tran_Size of all transactions regardless of completion status. |
| Availability_Secs | Number of seconds within the collection interval that this transaction was deemed available. |
| ElapsedTime_HistX_Count | Frequency of completed (or undetermined status) transactions the executed within ElapsedTime_HistX_Bound; "X", e.g., between 1 and 10 |
| ElapsedTime_HistX_Bound | Upper bound for "X" frequency range of ElapsedTime histogram |
| TranSize_HistX_Count | Frequency of completed (or undetermined status) transactions the executed within TranSize_HistX_Bound; "X", e.g., between 1 and 10 |
| TranSize_HistX_Bound | Upper bound for "X" frequency range of TranSize histogram |

According to exemplary embodiments, the aggregated performance statistics can be sampled on a periodic basis. At some regular interval, (e.g., every five minutes), the transaction performance statistics can be collected from the measurement agent. The sampled transaction statistics can be correlated to other transactions in the transaction hierarchy (e.g., the root and parent transaction types), the infrastructure components involved in the completion of the transaction (e.g., the requesting and servicing component identifies), and the consumer of the transaction. This information can be used to identify the cause of network events, or to identify "bottlenecks" in the flow of information through the managed network related to the transaction performance. The sampled statistics can be stored in a database on the managed node with the measurement agent that collected the data, or can be stored in a centralized database on a separate measurement server node in the network.

The exemplary method depicted in FIG. 1 employs a distributed aggregation approach to monitoring transaction performance in the managed network environment. That is, each node with transactional instrumentation in the managed network includes a measurement agent that can aggregate transaction completion events based on transaction keys that can identify the context of a particular transaction. The various tasks performed by the measurement agent in gathering statistics related to any particular transaction can be included on one or more of the managed nodes in the network.

According to an exemplary embodiment, the correlator can be generated at a node including the requesting component (a requesting node). The generated correlator can then be sent from the requesting node to a node including the servicing component (a servicing node) prior to starting the transaction. The requesting node can be a managed node that includes a measurement agent capable of generating the correlator. The servicing node can also be a managed node, itself having a measurement agent capable of recording an event associated with a completion of the transaction. The requesting and servicing nodes can be a common managed node in the network.

The measurement agent included in the servicing node can aggregate performance statistics on the transaction completion event in the context of the transaction keys included in the correlator sent from the requesting component. The measurement agent can then sample the aggregated performance statistics on a periodic basis. The sampled statistics can be stored in a database on the servicing node, or can be sent from the servicing node to a measurement server in the network, where the statistics can be stored in a centralized database.

Despite a reduction in performance statistics that can result from the upfront classification of transactions into transaction types, a desire can arise to further reduce the amount of transaction statistics gathered by measurement agents. This can be accomplished by combining the performance statistics of related transaction types, of related consumers, and of related requesting and servicing components during the aggregation process. For example, the statistics corresponding to related requesting and servicing components can be combined based on a network zone or a hardware platform where the components are installed. The performance statistics for related transaction types can be further aggregated using the transaction group definition of the related types. Consumers can be classified by the service-level to which they have subscribed (e.g., Platinum, Gold, Silver, Bronze, Other), and then this service-level can be passed in the correlator rather than individual user identifiers. Similarly, client nodes can be classified and aggregated by connection type (LAN, MODEM 28800, MODEM 56K, etc.).

The correlator can also be generated at a servicing node. According to an exemplary embodiment, the servicing node can be a managed node capable of performing the operations of recording a transaction completion event, and aggregating and sampling statistics on the serviced transaction. Alternatively, the generated correlator can be sent from the servicing node to a requesting node such that performance statistics can be aggregated on the requested transaction. The servicing node can be a managed node having a measurement agent capable of generating the correlator for the requested transaction, allowing the requesting node to be an unmanaged node in the network. Specific details regarding the identity of the requesting component on the unmanaged node can be unknown or it may be desired to have the identity remain anonymous. Accordingly, the measurement agent on the servicing node can generate (or fabricate) an identifier for the requesting component that can be included in the correlator sent to the requesting node.

Because the unmanaged requesting node can be incapable of gathering performance statistics on the transaction, the correlator received from the servicing node can be sent, along with the recorded transaction completion event, from the requesting node to a measurement server in the network. The measurement server can be a managed node in the network having a measurement agent capable of aggregating performance statistics on the transaction completion event in the context of the transaction keys included in the correlator sent from the requesting component. The measurement agent can then sample the aggregated performance statistics on a periodic basis and store the samples in a centralized database on the measurement server.

According to an exemplary embodiment, the transaction can be configured to probe an availability of a service of the servicing component, and a consumer identifier identifying a consumer of the transaction as a probe is included in the correlator. A "probe", as used herein, is a synthetic customer, designed to determine (or ping) the availability of a particular service or function in the managed network. There exist fundamental differences between "real" customer activity and the activity of probes that test for the availability services on a regular basis. These differences can be related to transaction size predictability, transaction status interpretation, and service availability durations.

It can be desirable to consider the size of a transaction when determining if a responsiveness threshold for the transaction has been violated. With real activity, transactions can vary in size with large transactions being expected to take longer to complete than smaller transactions. For example, a database query that results in 10,000 rows of the database can be expected to take longer than a query that results in only ten 10 rows of the database. With probe activity, the size of the transaction can be much more predictable, allowing the transaction size to be largely ignored when setting a responsiveness threshold for the probe transaction.

With real activity, a certain percentage of transactions are expected to "fail". For example, users can try to access a file that does not exist, or a file that the user does not have permission to access. These situations can result in a failed transaction, but the "failure" does not necessarily indicate that there is a problem in the managed network. Probe transactions, on the other hand can be designed to succeed. Accordingly, transaction failures from probes can more reliably be interpreted as relating to problems in the computing environment.

Probe transactions execute at a configured frequency. If a probe transaction fails, its failure can be interpreted as a problem that has existed for the entire duration of the interval between successive probe transactions. In contrast, the frequency of real activity can be unpredictable, making these types of interpretations less reliable.

Real and probe transaction activity can be distinguished when aggregating transaction performance statistics. According to exemplary embodiments, a requesting component that initiates a probe transaction can be treated as residing on an unmanaged node for purposes of the probe transaction. Accordingly, a servicing node that services the probe transaction generates a correlator for the probe transaction using its measurement agent. The generated correlator includes a consumer identifier that identifies the consumer of the transaction as a probe, allowing performance statistics generated on the transaction to be distinguished from those of real transactions.

Various aspects of the invention winnow be described in connection with exemplary embodiments. To facilitate an understanding of these embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Thus, the various aspects can be embodied in many different forms, and all such forms are contemplated to be within the scope of what is described. For each of the various aspects, any such form of embodiment can be referred to herein as "logic configured to" perform a described action, or alternatively as "logic that" performs a described action.

Figure 2:
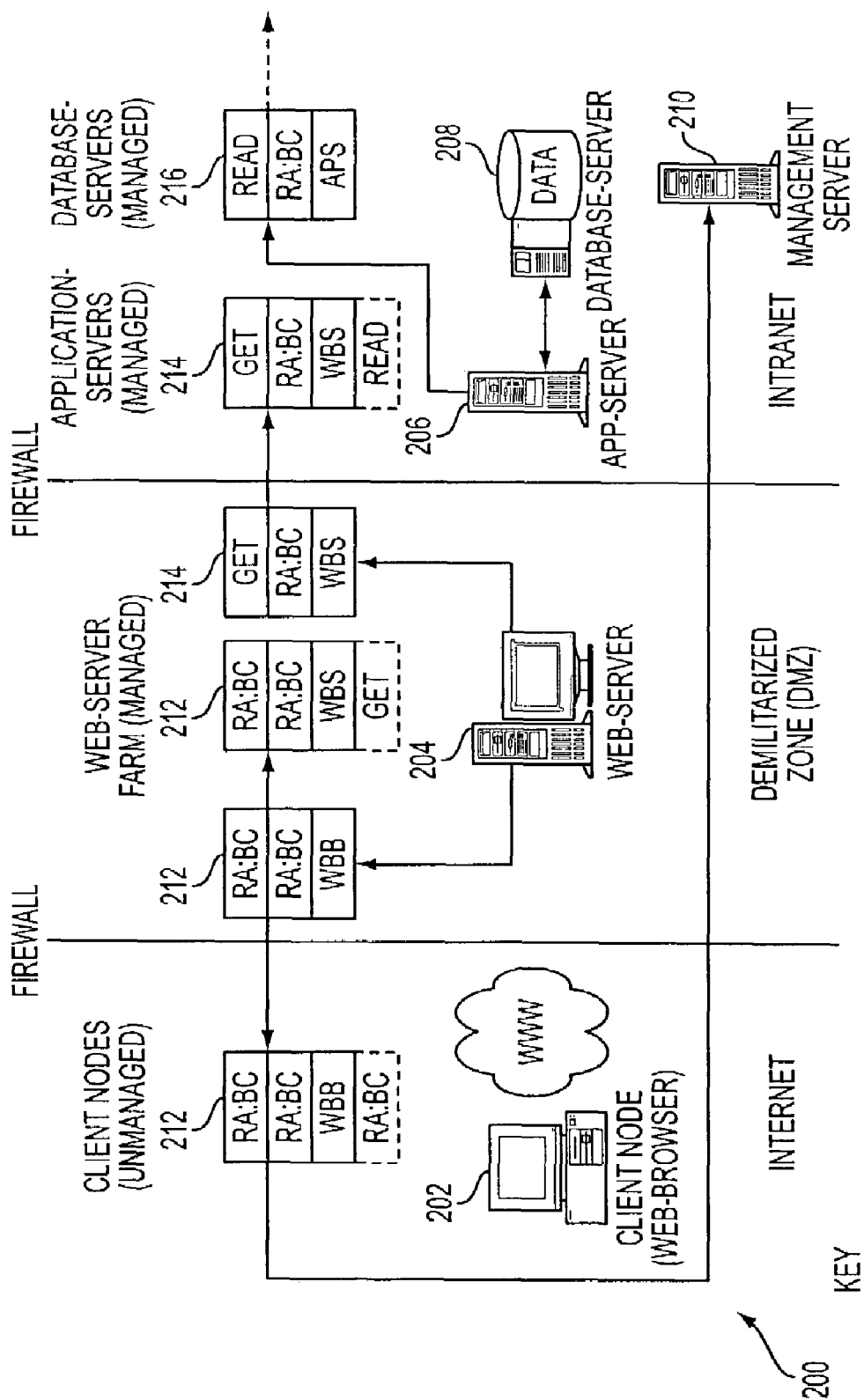
FIG. 2 illustrates a system for monitoring transaction performance in a managed computer network environment according to an exemplary embodiment.

A system for monitoring transaction performance in a managed computer network environment according to an exemplary embodiment is shown in FIG. 2. The system includes a processor and memory, each of which can be included in one managed node, or distributed across a number of managed nodes, in the computer network. The processor includes logic configured to classify a transaction, requested of a servicing component in the network, into a transaction type. The processor further includes logic configured to generate a correlator for the transaction including information identifying a parent transaction type and a root transaction type of the transaction. The processor also includes logic configured to record an event associated with a completion of the transaction. Logic is also included that is configured to aggregate performance statistics on the transaction completion event in the context of the information included in the correlator. The memory is configured to store the aggregated performance statistics.

The processor can be any computer circuitry, computer firmware, computer hardware or any combination thereof that can be used for correlating the computer network event and the performance parameter using an attribute of the received message. For example, according to an exemplary embodiment, the processor can be logic, referred to herein as a measurement agent, having program instructions executing on one managed node, or distributed across a number of managed nodes, in the computer network. The processor can execute software or firmware.

FIG. 2 illustrates an exemplary managed computer network 200. The network 200 can include infrastructure components that span from a private intranet to an internet, such as the World Wide Web (WWW), although the techniques described herein can be applied to client-server applications in any managed network environment, including private networks. Between the intranet and internet portions of the network lies an intermediate zone referred to in FIG. 2 as a demilitarized zone (DMZ). The FIG. 2 DMZ is illustrated as being separated from the internet and intranet portions of the network by respective firewalls.

The internet portion of the managed network can include unmanaged nodes, such as the client node 202 shown. The client node can include a web-browser component for browsing content accessible through the WWW. The DMZ portion of the network can include managed nodes, such as the web-server 204 shown. The intranet portion of the network can also include managed nodes, such as the application-server 206 and the database-server 208 shown. According to exemplary embodiments, the intranet portion of the network can also include an additional managed node dedicated to the monitoring and management of the network, such as the measurement-server 210 shown.

The processor and memory will now be described further in conjunction with an illustrative example. Consider the example introduced above, in which a user (or consumer) is browsing a web site through the WWW using a web-browser installed on the client node 202 (referred to hereafter as the web-browser 202). The web site can be a retail application functioning as an electronic store front for a business. The retail application can offer the consumer various services, including a browse catalog operation, a search operation, and a login operation, e.g., to allow the consumer to sign-in to a secure web site to place and check the status of orders.

In the example, the consumer chooses to browse the retail application's catalog. This action initiates a series (or hierarchy) of transactions to accomplish the browse catalog operation. A first transaction can be defined as starting when the consumer initiates the navigation (e.g., by clicking on a hypertext link using a mouse) to the catalog web page, and as ending when the catalog page is displayed on the web-browser 202. This can be defined as the root transaction in the transaction hierarchy.

A second transaction can be defined as starting when the web-server 204 requests information needed to render the catalog page using information available from the database-server 208 (e.g., using an HTTP:GET command), and as ending when the information has been sent to the web-server 204. A third transaction can be defined as starting when the application-server 206 initiates a read operation to retrieve the catalog information from the database-server 208, and as ending when the catalog information has been retrieved. It will be understood that the read operation can include two transactions that can be separately measured, one serviced by the application-server 206, and another serviced by the database-server 208. For illustration purposes, processing of the read transaction will only be described from the perspective of the application-server 206 (i.e., including any processing that occurs at the database-server 208).

Processing of the exemplary transactions will now be discussed in conjunction with the network arrangement 200 shown in FIG. 2. The processor, which can be included in one managed node or be distributed across a number of managed nodes in the network 200, includes logic configured to classify the transaction. The logic configured to classify the transaction can generally be included in the servicing node. For example, the web-server 204, which services the transaction that requests information to render the catalog web page, can classify the transaction as a "GET" transaction type. Similarly, the application-server 206, which services the transaction that retrieves the catalog information from the database-server 208, can classify the transaction a "READ" transaction type.

An exception can occur when the servicing node is an unmanaged node. For example, the web-browser 202 that services the browse catalog operation initiated by the consumer can be an unmanaged node incapable of classifying transactions into transaction types. To address this situation, the classification can occur in a managed, downstream (in the hierarchy) component, such as the web-server 204. In the example, logic included in the web-server 204 can classify the transaction as a "RA:BC" ("Retail Application:Browse Catalog") transaction type. The classified type can be configured to include all browse catalog transactions for any business application available in the managed network. The classified transaction type can then be passed from the web-server 204 to the web-browser 202 in a correlator generated for the browse catalog transaction at the web-server 204.

The processor further includes logic configured to generate a correlator for the transaction including information identifying a parent transaction type and a root transaction type of the transaction. The logic configured to generate a correlator can be included in a requesting node or a servicing node for the transaction, or any managed node in the network. For example, the web-server 204 can include logic for generating a first correlator 212 that can be used in aggregating statistics for the RA:BC transaction type operation serviced by the unmanaged web-browser 202 (shown as the dotted-line entry in the correlator 212 above the web-browser 202). The web-server 204 can generate the first correlator 212 for the web-browser 202, as the unmanaged web-browser 202 can be incapable of generating the correlator 212 itself. The first correlator 212 can be passed to the web-browser 202 from the web-server 204. Information needed to render the catalog page can also be included. Statistics can then be aggregated on the RA:BC transaction type operation.

The first correlator 212 (a portion of which is shown) includes identifiers of a parent transaction type and a root transaction type of the transaction, and a requesting component identifier. For the RA:BC transaction type, the root and parent transaction types are the same, namely "RA:BC". Recall that the requesting component identifier for an unmanaged node, such as the web-browser 202, can be unknown or desire to remain anonymous. In these circumstances, the managed node generating the correlator (here the web-server 204) can include logic to generate (or fabricate) an identifier for the requesting component that can be included in the correlator sent to the web-browser. In the example shown, a requesting component identifier of "WBB" (for web-browser) can be generated.

The same first correlator 212 can be used to aggregate statistics on a GET transaction type operation serviced by the web-server 204 (shown as the dotted-line entry in the correlator 212 above the web-server 204). The parent and root transaction type identifiers of "RA:BC", and the requesting component identifier of "WBB" used in aggregating statistics on the RA:BC transaction type operation are applicable to the GET transaction type operation as well.

The web-server 204 logic can also be configured to generate a second correlator 214 that can be used when aggregating statistics on the READ transaction type operation. In the example shown, the second correlator 214 includes a parent transaction type identifier of "GET", a root transaction type identifier of "RA:BC", and a requesting component identifier of "WBS" (for web-server). The second correlator 214 can be passed to the application-server 206 prior to the start of the database read operation, such that performance statistics on the read operation can be aggregated in the context of the information included in the second correlator 214.

If a fourth transaction were to exist in the transaction hierarchy, the application-server 206 can include logic configured to generate a third correlator 216 that can be used aggregate statistics on the fourth transaction type operation. The third correlator 216 can include a parent transaction type identifier of "READ", a root transaction type identifier of "RA:BC", and a requesting component identifier of "APS" (for application-server). The third correlator 216 can then be passed to a servicing component (not shown) tasked with servicing the fourth transaction.

The processor can include logic configured to record an event associated with a completion of the transaction. The logic can be included on managed and unmanaged nodes in the network. Examples of the transaction completion events that can be recorded on managed and unmanaged nodes are provided in Table 1 and the paragraph that immediately follows Table 1, respectively.

The processor can include logic configured to aggregate performance statistics on the transaction completion event in the context of the information included in the correlator. The logic to aggregate the performance statistics can be included on managed nodes in the network. Examples of the aggregated statistics produced by the logic are provided in Table 2.

Logic configured to sample the aggregated performance statistics on a periodic basis can also be included in the processor. This logic can be included on managed nodes in the network. Memory can also be included on managed nodes in the network, and configured to store the sampled aggregated performance statistics.

According to exemplary embodiments, the managed nodes in the network can send the periodically sampled aggregated performance statistics to the measurement server 210, where the sampled statistics can be stored in a centralized database. The measurement server 210 can be a managed node in the network, and include logic configured to aggregate performance statistics on a transaction completion event recorded at an unmanaged node (e.g., the web-browser 202) in the context of the information included in a correlator (e.g., the correlator 212) associated with the transaction completion event. The correlator and recorded completion event can be sent from the unmanaged node (e.g., the web-browser 202) to the measurement server 210 which can then aggregate performance statistics on the completed transaction (e.g., the browse catalog operation). The measurement server 210 can also include logic configured to sample the performance statistics aggregated for the transaction serviced by the unmanaged node, and store the sampled performance statistics in its centralized database.

The processor can also include logic configured to combine the performance statistics of related transaction types, of related consumers, and of related requesting and servicing components during the aggregation process. Such logic can be included on managed nodes in the network. Examples of how these statistics can be combined has been described in conjunction with the exemplary method shown in FIG. 1.

FIG. 3 shows an exemplary data structure for correlating performance statistics on a transaction between a requesting component and a servicing component in a managed computer network environment. The data structure can function as a correlator, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The data structure can include fields containing data representing a parent and root transaction of the transaction, a parent and root transaction type of the transaction, a consumer of the transaction, and the requesting component. These fields of the data structure can be referred to as transactional-based fields. The data contained in the transaction-based fields can be combined with other transaction-specific information, including data representing the transaction itself, the classified transaction type, and the component servicing the transaction, to provide context to performance statistics aggregated on a completion event associated with the transaction.

Examples of data that can represent the parent and root transaction types, the consumer, and the requesting and servicing components of a transactions are provided in conjunction with the exemplary method shown in FIG. 1. The fields containing data representing the parent and root transaction of the transaction (to be distinguished from the parent and root transaction types already discussed) can represent the actual parent and root transactions themselves.

For example, the field representing the parent transaction can contain data identifying a specific browse catalog operation occurring at a specific time (and day), whereas the field representing parent transaction type can contain data identifying the classified transaction as a browse catalog transaction type (e.g., RA:BC). The transaction-specific information included in the data structure can be used to "drill-down" or focus on particular transactions or infrastructure components once a particular transaction type or component type is believed to be impacting the performance of the network.

Additional fields related to data structure itself, in contrast to the transactional-based fields described above, can be included in the data structure. These additional fields can include data representing a length of the data structure, a format of the data structure, and a number of flags configured to control the aggregation of performance statistics on the transaction.

In the examples described above, string values (e.g., "RA:BC", "WBS", etc . . . ) have been used to illustrate the data representing the various fields in the correlator data structure. It will be understood that any suitable data format can be used to represent the data stored in correlator data structure. According to an exemplary embodiment, the data of transactional-based fields can be represented using globally unique IDs (or GUIDs). A GUID is a unique, essentially random 16-byte user ID, which can be represented as 32 hexadecimal digits. The ID can be constructed from the network addresses of the requesting and servicing components, the date, and the time of day. Should a requesting component identifier need to be generated for an unmanaged node, a managed node can generate a compatible identifier that will not collide with any assignable GUID.

The steps of a computer program as illustrated in FIG. 1 for monitoring transaction performance in a managed computer network environment can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can contain or store the program for use by or in connection wit the instruction execution system, apparatus, or device. The computer readable medium can be, for example but not limited to, an electronic, magnetic, optical, electromagnetic, infrared, or semiconductor system, apparatus or device. More specific examples (a non-exhaustive list) of the computer-readable medium can include the following: a portable computer diskette, a random access memory (RAM), a read-only memory (ROM), and erasable programmable read-only memory (EPROM or Flash memory), and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for monitoring transaction performance in a managed computer network environment having a requesting component configured to request a transaction of a servicing component, the method comprising:
classifying the transaction into a transaction type;
generating, at a node including the requesting component, a correlator for the transaction including information identifying a parent transaction type and a root transaction type of the transaction to send the correlator from the node including the requesting component to a node including the servicing component prior to starting the transaction;
recording an event associated with a completion of the transaction; and
receiving the correlator for aggregating performance measurements on the transaction completion event based on the information identifying a parent transaction type and a root transaction type of the transaction included in the correlator;
wherein the correlator is generated at a node including the servicing component; and
wherein the transaction is configured to probe an availability of a service of the servicing component, and a consumer identifier identifying a consumer of the transaction as a probe is included in the correlator.

2. The method of claim 1 wherein the recording and aggregating occur at the node including the servicing component.

3. The method of claim 2, comprising:
sampling the aggregated performance measurements on a periodic basis;
sending the sampled aggregated performance measurements from the node including the servicing component to a measurement server in the network; and
storing the sampled aggregated performance measurements in a reporting database on the measurement server.

4. The method of claim 1, wherein the correlator includes:
a parent transaction identifier;
a root transaction identifier;
a consumer identifier identifying a consumer of the transaction; and
a requesting component identifier.

5. The method of claim 4, wherein the performance measurements are aggregated across combinations of transaction keys, including:
the root transaction type;
the parent transaction type;
the transaction type;
the consumer identifier;
the requesting component identifier; and
a servicing component identifier.

6. The method of claim 5, wherein the aggregating comprises:
  combining the performance measurements-of related transaction types;
  combining the performance measurements of related consumers; and
  combining the performance measurements of related requesting and servicing components.

7. The method of claim 1, wherein the recording and aggregating occur at the node including the servicing component.

8. The method of claim 1, comprising:
  sending the correlator from the node including the servicing component to a node including the requesting component.

9. The method of claim 1, wherein the requesting component is included in an unmanaged node in the network, the method comprising:
  generating an identifier for the requesting component at the node including the servicing component.

10. The method of claim 1, wherein the parent transaction type and the root transaction type of the correlator can track a transaction involving multiple nodes.

11. The method of claim 1, wherein the performance measurements are aggregated across any combination of the transactional information, and when the requesting component is included on a same node as the servicing component, the performance measurements are aggregated based on at least an identification of the servicing component.

12. A system for monitoring transaction performance in a managed computer network environment having a requesting component configured to request a transaction of a servicing component, the system comprising:
  a processor, including:
    logic configured to classify the transaction into a transaction type;
    logic configured to generate a correlator for the transaction is included in a node including the requesting component, the correlator generator logic including information identifying a parent transaction type and a root transaction type of the transaction to send the correlator from the node including the requesting component to a node including the servicing component prior to starting the transaction;
    logic configured to record an event associated with a completion of the transaction; and
    logic configured to receive the correlator and aggregate performance measurements on the transaction completion event based on the information identifying a parent transaction type and a root transaction type of the transaction included in the correlator; and
  memory configured to store the aggregated performance measurements;
  wherein the logic configured to generate a correlator is included in a node including the servicing component; and
  wherein the transaction is configured to probe an availability of a service of the servicing component, and a consumer identifier identifying a consumer of the transaction as a probe is included in the correlator.

13. The system of claim 12, wherein the logic configured to record and aggregate are included in the node including the servicing component.

14. The system of claim 13, comprising:
  logic configured to sample the aggregated performance measurements on a periodic basis; and
  communication configured to send the sampled aggregated performance measurements from the node including the servicing component to a measurement server in the network; wherein the memory includes a reporting database on the measurement server for storing the sampled aggregating performance measurements.

15. The system of claim 12, wherein the correlator includes:
  a parent transaction identifier;
  a root transaction identifier;
  a consumer identifier identifying a consumer of the transaction; and
  a requesting component identifier.

16. The system of claim 15, wherein the performance measurements are aggregated across combinations of transaction keys, including:
  the root transaction type;
  the parent transaction type;
  the transaction type;
  the consumer identifier;
  the requesting component identifier; and
  a servicing component identifier.

17. The system of claim 16, wherein the logic configured to aggregate comprises:
  logic configured to combine the performance of related transaction types;
  logic configured to combine the performance measurements of related consumers; and
  logic configured to combine the performance measurements of related requesting and servicing components.

18. The system of claim 12, wherein the logic configured to record and aggregate are included in the node including the servicing component.

19. The system of claim 12, comprising:
  communication means configured to send the correlator from the node including the servicing component to a node including the requesting component;
  communication means configured to send the correlator and the recorded transaction completion event from the node including the requesting component to a measurement server in the network, wherein the logic configured to aggregate is included in the measurement server; and
  logic configured to sample the aggregated performance measurements on a periodic basis; wherein the memory includes a reporting database on the measurement server for storing the sampled aggregating performance measurements.

20. The system of claim 12, wherein the node including the requesting component is an unmanaged node in the network, the system comprising:
  logic configured to generate an identifier for the requesting component at the node including the servicing component.

21. The system of claim 13, wherein the parent transaction type and the root transaction type of the correlator can track a transaction involving multiple nodes.

22. A computer-readable medium containing a computer program for monitoring transaction performance in a managed computer network environment having a requesting component configured to request a transaction of a servicing component, wherein the computer program performs the method of:
  classifying the transaction into a transaction type;
  generating, at a node including the requesting component, a correlator for the transaction including information identifying a parent transaction type and a root transaction type of the transaction to send the correlator from the node including the requesting component to a node including the servicing component prior to starting the transaction;

recording an event associated with a completion of the transaction; and receiving the correlator for aggregating performance measurements on the transaction completion event based on the information identifying a parent transaction type and a root transaction type of the transaction included in the correlator;

wherein the correlator is generated at a node including the servicing component; and wherein the transaction is configured to probe an availability of a service of the servicing component, and a consumer identifier identifying a consumer of the transaction as a probe is included in the correlator.

23. The computer-readable medium of claim 22, wherein the recording and aggregating occur at the node including the servicing component.

24. The computer-readable medium of claim 23, wherein the method comprises:

sampling the aggregated performance measurements-on a periodic basis;

sending the sampled aggregated performance measurements-from the node including the servicing component to a measurement server in the network; and storing the sampled aggregated performance measurements-in a reporting database on the measurement server.

25. The computer-readable medium of claim 22, wherein the correlator includes:

a parent transaction identifier;

a root transaction identifier;

a consumer identifier identifying a consumer of the transaction; and a requesting component identifier.

26. The computer-readable medium of claim 25, wherein the performance measurements-are aggregated across combinations of transaction keys, including:

the root transaction type;

the parent transaction type;

the transaction type;

the consumer identifier;

the requesting component identifier; and a servicing component identifier.

27. The computer-readable medium of claim 26, wherein the aggregating comprises:

combining the performance measurements of related transaction types;

combining the performance measurements of related consumers; and combining the performance measurements of related requesting and servicing components.

28. The computer-readable medium of claim 22, wherein the recording and aggregating occur at the node including the servicing component.

29. The computer-readable medium of claim 22, wherein the method comprises:

sending the correlator from the node including the servicing component to a node including the requesting component;

sending the correlator and the recorded transaction completion event from the node including the requesting component to a measurement server in the network, wherein the aggregating occurs at the measurement server; and sampling the aggregated performance measurements on a periodic basis.

30. The computer-readable medium of claim 22, wherein the requesting component is included in an unmanaged node in the network, and wherein the method comprises:

generating an identifier for the requesting component at the node including the servicing component.

31. The computer-readable medium of claim 22, wherein the parent transaction type and the root transaction type of the correlator can track a transaction involving multiple nodes.

* * * * *